(12) United States Patent
Lefevre et al.

(10) Patent No.: US 11,909,523 B2
(45) Date of Patent: Feb. 20, 2024

(54) USING SHORTENED CODEWORDS IN PASSIVE OPTICAL NETWORKS

(71) Applicant: Nokia Solutions and Networks Oy, Espoo (FI)

(72) Inventors: Yannick Lefevre, Heverlee (BE); Amitkumar Mahadevan, Edison, NJ (US); Werner Van Hoof, Aartselaar (BE)

(73) Assignee: Nokia Solutions and Networks Oy, Espoo (FI)

( * ) Notice: Subject to any disclaimer, the term of this patent is extended or adjusted under 35 U.S.C. 154(b) by 137 days.

(21) Appl. No.: 17/573,930

(22) Filed: Jan. 12, 2022

(65) Prior Publication Data

US 2023/0224074 A1    Jul. 13, 2023

(51) Int. Cl.
*H04B 10/27* (2013.01)
*H04L 1/00* (2006.01)

(52) U.S. Cl.
CPC ........... *H04L 1/0042* (2013.01); *H04B 10/27* (2013.01)

(58) Field of Classification Search
CPC .............................. H04B 10/27; H04L 1/0042
See application file for complete search history.

(56) References Cited

U.S. PATENT DOCUMENTS

2008/0301517 A1* 12/2008 Zhong ................ H03M 13/1102
714/752
2010/0316381 A1    12/2010 de Lind van Wijngaarden
2015/0214981 A1*  7/2015 Prodan ................... H03M 13/17
714/762
2021/0176544 A1*  6/2021 Luo ..................... H04Q 11/0071
2021/0281501 A1    9/2021 Mahadevan et al.

FOREIGN PATENT DOCUMENTS

WO      2019169373 A1      9/2019

OTHER PUBLICATIONS

Rec. ITU-T G.9804.2, Higher speed passive optical networks—Common transmission convergence layer specification; Sep. 2021; https://www.itu.int/rec/T-REC-G.9804.2-202109-I/en (Year: 2021).*

(Continued)

*Primary Examiner* — Nathan M Cors
(74) *Attorney, Agent, or Firm* — Mendelsohn Dunleavy, P.C.; Steve Mendelsohn

(57) ABSTRACT

An upstream (US) optical line terminal (OLT) for a passive optical network having at least one downstream (DS) optical network unit (ONU). The OLT generates a trigger signal indicating a need to receive at least one US burst having a shortened codeword for a first forward error-correction (FEC) code. Based on the trigger signal, the OLT transmits a DS message instructing the ONU to transmit an US burst having a shortened codeword. The OLT receives and decodes the US burst having the shortened codeword using the first FEC code. During periods of high bit-error rate, the shortened codewords increase the ability of the OLT to decode the US bursts and keep communications from the ONU alive. The OLT can use the decoded US bursts to measure BER and, if appropriate, instruct the ONU to use a different FEC code.

32 Claims, 5 Drawing Sheets

(56) References Cited

OTHER PUBLICATIONS

ITU-T, Recommendation G.9804.2 "Higher speed passive optical networks—Common transmission convergence layer specification." Published Sep. 2021 (2021): 1-235.
ITU-T, Recommendation G.9804.3 "50-Gigabit-capable passive optical networks (50G-PON): Physical media dependent (PMD) layer specification." Published Sep. 2021 (2021): 1-41.
Extended European Search Report and Written Opinion for corresponding European application No. 23151321.9; dated Jun. 6, 2023 (9 pages).

* cited by examiner

USING SHORTENED CODEWORDS IN PASSIVE OPTICAL NETWORKS

BACKGROUND

Field of the Disclosure

The present disclosure relates to communications and, more specifically, to passive optical networks (PONs) that employ forward error correction (FEC) coding during upstream burst-mode communications.

Description of the Related Art

This section introduces aspects that may help facilitate a better understanding of the disclosure. Accordingly, the statements of this section are to be read in this light and are not to be understood as admissions about what is prior art or what is not prior art.

Next-generation passive optical networks (PONs) provide broadband access. They have a point-to-multi-point (P2MP) topology, in which one optical line terminal (OLT) at the network side is used to connect to a multitude (e.g., up to 64) of optical network units (ONUs) at the user side by means of an optical distribution network (ODN) or fiber plant that contains optical fibers and passive splitters/combiners, but no active components.

Most PON technologies, such as G-PON, E-PON, and XGS-PON, are time-division multiplexing (TDM) PON technologies, in which the fiber medium is shared in time between the different ONUs. Time- and wavelength-division multiplexing (TWDM) PON technologies also exist, such as NG-PON2, in which multiple TDM systems operating at different wavelengths are stacked on the same PON system.

In the downstream (DS) direction, the OLT simultaneously broadcasts the downstream signal to multiple ONUs over a shared ODN on one or more specified downstream wavelength. Upstream (US) communication from the various ONUs to the OLT is achieved via burst-mode time-division multiple access (TDMA) on one or more specified upstream wavelengths, which are different from the one or more downstream wavelengths. More specifically, each ONU transmits US bursts upon explicit request by the OLT and remains silent, disabling its transmitter, in between bursts.

A US burst refers to a communication session in which an ONU transmits an upstream physical synchronization block (PSBu) immediately followed by one or more contiguous codewords to the OLT during a particular time period, where each codeword conforms to a specified format. When the ONU employs FEC coding, each codeword comprises a set of information bits and a set of parity bits. Note that, when the ONU does not employ FEC coding, the term "codeword" is understood to include only information bits.

To ensure efficient transmission, the 50G PON G.9804.2 standard specifies that, when the information content of a US burst does not fully occupy the last (or only) codeword in a burst, the encoder generates a shortened last codeword by padding zero bits to the information portion to fill it up (e.g., padding up to 14592 bits in the default G.9804.2 FEC code), computing the parity, removing the padding bits, and transmitting only the shortened codeword (i.e., not transmitting the padding bits). Since the OLT knows the amount of shortening applied to the last (or only) codeword, the OLT re-inserts the zero padding bits at the end of the information portion of the shortened codeword before FEC decoding.

SUMMARY

In 2021, the International Telecommunication Union (ITU) accepted the new 50G PON G.9804 standard comprising the G.9804.2 specification describing the transmission convergence (TC) layer and the G.8904.3 specification describing the physical media dependent (PMD) layer, the teachings of which are incorporated herein by reference in their entirety. This new standard describes 50G in DS and 12.5G or 25G in US. In this standard, as in previous standards, a single FEC code is used in the upstream direction for all the ONUs (where the FEC code can optionally be turned off). For the G.9804.2 standard, the FEC code is a binary low-density parity-check (LDPC) code with 57*256=14592 information bits and 10.5*256=2688 parity bits giving a total codeword length of 17280 bits.

It has been agreed that an amendment to the G.9804 standard will adopt a flexible FEC scheme in the upstream direction where multiple LDPC codes will be defined, and a particular LDPC code can be selected on a per-ONU basis. In this way, throughput can be traded off with sensitivity. Specifically, higher-rate codes (i.e., codes having a higher ratio of information bits to parity bits) can be used for ONUs with a good channel, leading to a higher throughput, while lower-rate codes can be used for ONUs with a bad channel, leading to a better sensitivity. This flexible FEC scheme allows both increasing the US throughput on a PON as well as reducing margins. U.S. Patent Publication No. 2021/0281501A1, the teachings of which are incorporated herein by reference in their entirety, describes techniques for selecting a FEC code for an ONU in a PON.

To select a FEC code for an ONU, the OLT may first estimate the channel quality of the ONU. Furthermore, if and when the ONU's channel quality becomes too poor for the currently selected FEC code, the OLT may replace the current FEC code with a different, lower-rate FEC code. On the other hand, if and when the ONU's channel quality becomes "too good" for the current FEC code, the OLT may replace the current FEC code with a different, higher-rate FEC code. Since the FEC code performance depends typically on the bit error rate (BER) of the US signal received by the OLT from the ONU, it is desired to estimate the BER of that US signal.

Note that, if the US link for an ONU becomes unusable due to the BER becoming too high for the current FEC code, then the OLT may be unable to decode the codewords in the corresponding US signal. As a result, communication from the ONU to the OLT may be lost and the OLT may be unable to replace the current FEC code, since any flex FEC code switch may need to be communicated via maintenance messaging such as Physical-Layer Operation Administration and Maintenance (PLOAM) messaging or ONU Management and Control Interface (OMCI) messaging. To make a synchronous change of the FEC code at the both the OLT and ONU, a two-way control communication may be needed so that the ONU can acknowledge the FEC code change. This might not be possible if the BER is too high for the current FEC code. In other words, when a certain FEC code is active for an ONU, and suddenly the BER deteriorates beyond the BER that the FEC code can reliably correct, then full-size codewords may be uncorrectable and it might not be possible to synchronously switch to a different FEC code that is able to handle the high BER.

Shortcomings in the prior art are addressed in accordance with the principles of the present disclosure by an OLT specifically requesting that an ONU transmit one or more US bursts having shortened codewords (each shortened codeword having a partial set of information bits and a full set of parity bits) such that, in the event that the BER is too high for the OLT to be able to reliably decode bursts having full-size codewords, the full set of parity bits in each shortened codeword will enable the OLT to more reliably decode the shortened codeword. The OLT can use these US bursts with shortened codewords to (i) maintain communications with the ONU in the face of high BER and/or (ii) estimate the current BER to determine whether to switch to a different FEC code that will enable more-reliable decoding of US bursts having full-size codewords when the BER is high.

The present disclosure is based on the observation that, by scheduling bursts having shortened codewords, effectively an FEC code with a lower code rate and thus more error-correcting capabilities is used without explicitly specifying a different FEC code. As a result, shortened codewords can be successfully decoded at a higher BER, and thus such higher BERs can also be estimated. This has at least two benefits. First, it enables measurement of a BER that is too high for the current FEC code for full-size codewords. Second, it enables the US communication to be maintained (i.e., kept alive) even though the BER is beyond the current FEC code's capabilities for full-size codewords.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
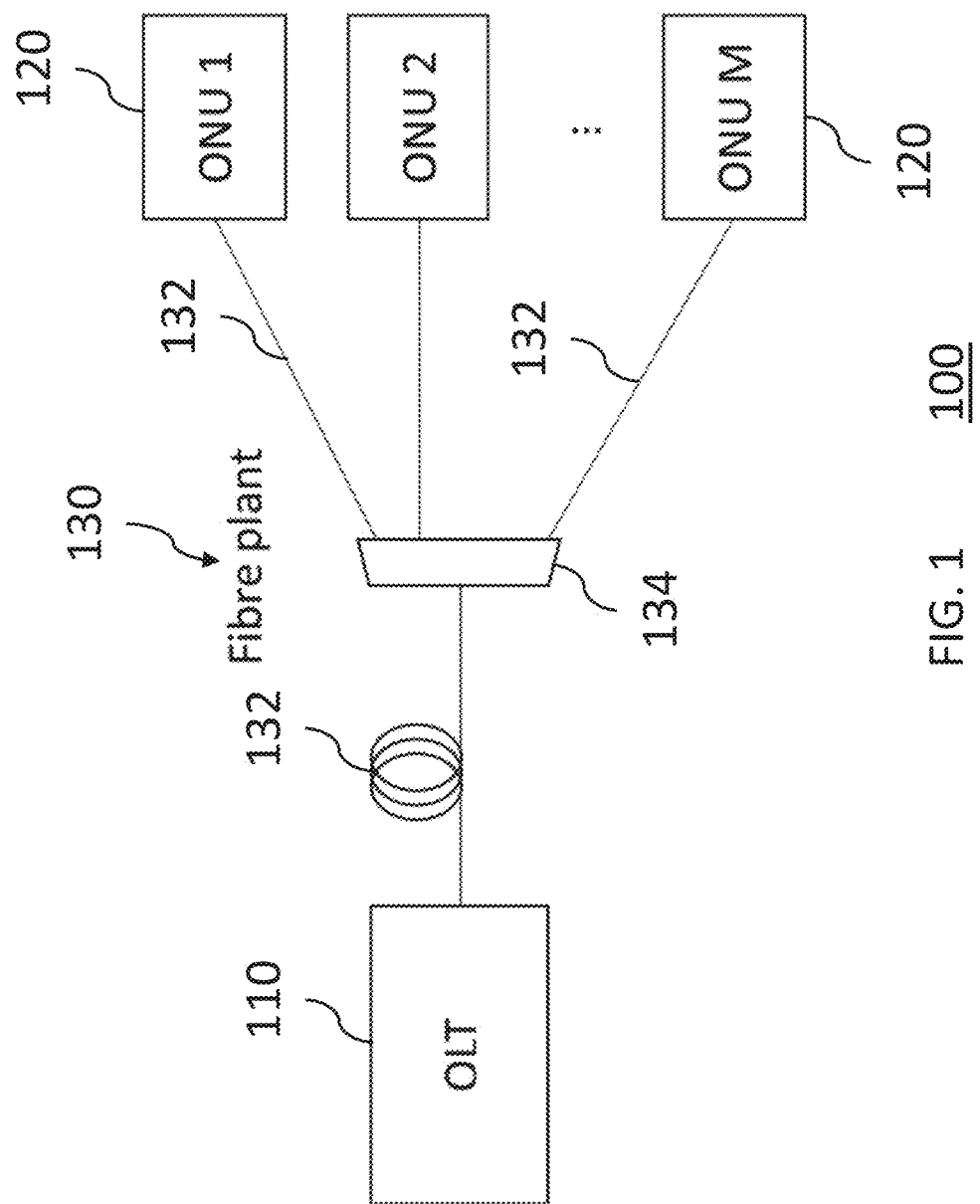
FIG. 1 is a simplified block diagram showing the topology of a PON system according to certain embodiments of the present disclosure.

FIG. 1 is a simplified block diagram showing the topology of a PON system 100 according to certain embodiments of the present disclosure. As shown in FIG. 1, PON system 100 has an OLT 110 that communicates with a number of ONUs 120 over a fiber plant 130 comprising optical fibers 132 and one or more splitter/combiners 134. In certain implementations, PON system 100 conforms to a version of the G.9804.2 standard.

Figure 2:
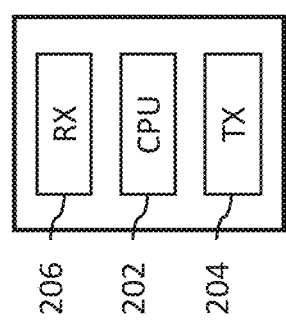
FIG. 2 is a simplified block diagram of a generic node that can be used to implement each instance of the OLT and the ONUs of FIG. 1.

FIG. 2 is a simplified block diagram of a generic node 200 that can be used to implement each instance of the OLT 110 and the ONUs 120 of FIG. 1. As shown in FIG. 2, a processor (CPU) 202 controls (i) the transmit operations of a transmitter (TX) 204 and (ii) the receive operations of a receiver (RX) 206. When node 200 is used to implement the OLT 110, the transmitter 204 transmits DS optical signals to the ONUs 120, and the receiver 206 receives US optical signals from the ONUs 120. Analogously, when node 200 is used to implement an ONU 120, the transmitter 204 transmits US optical signals to the OLT 110, and the receiver 206 receives DS optical signals from the OLT 110.

Referring again to FIG. 1, in general, the OLT 110 broadcasts DS messages instructing individual ONUs 120 when to transmit US bursts, where each US burst contains a PSBu followed by one or more codewords, each of which contains a set of information bits and a set of parity bits. Note that, in situations in which FEC coding is disabled or otherwise not supported by the ONU, each "codeword" contains only information bits.

For a given FEC code, all full-size codewords have the same number of information bits and the same number of parity bits. Different FEC codes may have different numbers of information bits and/or different numbers of parity bits, where the ratio of the number of information bits to the total number of information and parity bits (i.e., the code rate) is one factor that determines the fraction of bit errors that can be corrected in a given codeword. Typically, for the same number of parity bits, FEC codes having lower code rates are able to correct errors with a higher bit-error-rate than FEC codes having higher code rates.

According to certain embodiments of the disclosure, the OLT 110 is capable of specifically instructing an ONU 120 to transmit one or more US bursts, each having one or more shortened codewords in which each shortened codeword has a full set of parity bits for the current FEC code but only a partial set of information bits. As such, the code rate for the shortened codewords is smaller than the code rate for full-size codewords for the same FEC code. As a result, the OLT 110 will be better able to recover the original information bits from a shortened codeword when the BER is high than from a full-size codeword using the same FEC code. The OLT 110 can use these shortened codewords to maintain communications from the ONU 120 even when the BER is too high for the OLT to reliably decode full-size codewords. In addition or instead, the OLT 110 can use these shortened codewords to measure the current BER and use that measurement to determine whether to switch to a different FEC code (i.e., having a lower code rate) that will be more reliable than the current FEC code in the face of a high BER. The shortened codewords can also be used to switch to a FEC code having higher code rate if the channel has a lower BER.

In some implementations, the OLT 110 instructs the ONU 120 to transmit a burst containing a single shortened codeword. In other implementations, the OLT 110 instructs the ONU 120 to transmit a burst containing multiple shortened codewords. In still other implementations, the OLT 110 instructs the ONU 120 to transmit a US burst containing one or more full-size codewords and one or more shortened codewords independent of whether or not the grant size for the US burst would otherwise warrant the inclusion of a single shortened codeword at the end of the burst. Note that, in some implementations in which an ONU 120 transmits bursts having both full-size and shortened codewords, the one or more shortened codewords might appear anywhere in a burst and not necessarily only at the end of the burst.

In some implementations, the information bits of a shortened codeword include a maintenance message such as a PLOAM message or an OMCI message. In some of those implementations, the grant size may be zero such that all of the information bits are based on the framing sublayer (FS) header that may include a PLOAM message and the FS trailer. Note that grant sizes other than a grant size of zero can be used to request shortened codewords with or without including a maintenance message. In some implementations, the information bit values and therefore also the parity bit values of a shortened codeword are known a priori by both the ONU 120 and the OLT 110 such that the OLT 110 can determine the number of bit errors without even having to decode the shortened codeword.

Figure 3:
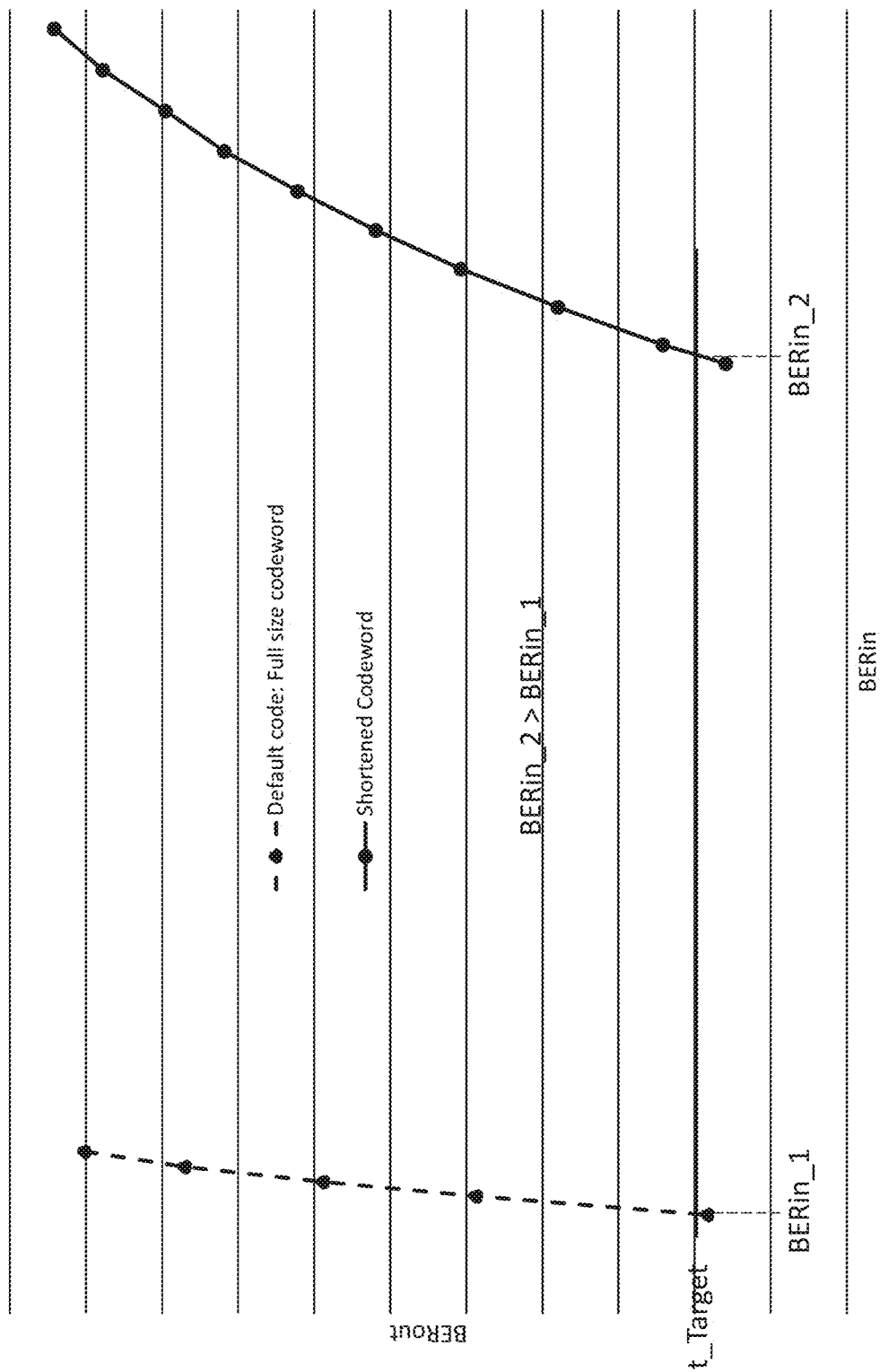
FIG. 3 is a graphical representation of relative performance of the G.9804.2 default FEC code for full-size codewords vs. the same FEC code for shortened codewords.

FIG. 3 is a graphical representation of relative performance of the G.9804.2 default FEC code for full-size codewords (the left curve in FIG. 3) vs. the same FEC code for shortened codewords (the right curve in FIG. 3). As shown in FIG. 3, using such shortened codewords enables the OLT 110 to successfully decode codewords even when BERs are higher than the BERs that can be successfully decoded using full-size codewords. For example, for the shortened codewords, the target output BER (BERout_Target) can be achieved at input BER, BERin_2, which is higher than the input BER, BERin_1, that achieves BERout_Target for the full-size codewords.

Figure 4:
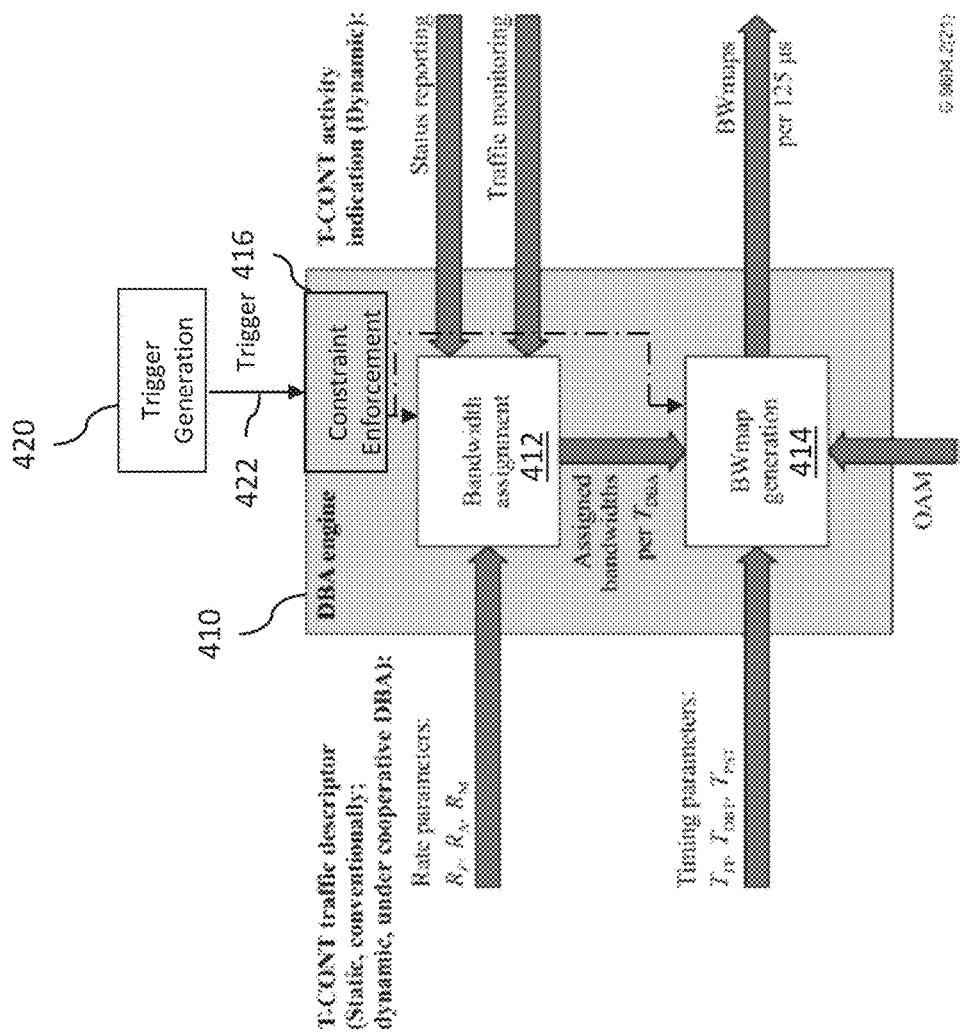
FIG. 4 is a functional block diagram showing the dynamic bandwidth assignment engine of the OLT of FIG. 1.

FIG. 4 is a functional block diagram showing the dynamic bandwidth assignment (DBA) engine 410 of the OLT 110 of FIG. 1, which estimates the required bandwidths for different ONUs/traffic flows. Those skilled in the art will understand that FIG. 4 is based on FIG. 7-2 of the G.9804.2 standard. As taught in the G.9804.2 standard and as shown in FIG. 4, the bandwidth assignment function 412 of the DBA engine 410 determines the bandwidth for US bursts to be transmitted by a specific ONU 120 in a US frame, where that allocated bandwidth is specified in terms of one or more grant sizes for the US bursts. In general, the total number of information bits in the US bursts is based on the sum of the one or more grant sizes plus the size of PLOAM messages, if such messages are requested in the US burst.

As taught in the G.9804.2 standard and as shown in FIG. 4, the bandwidth map (BWmap) generation function 414 generates one BWmap per frame of 125 microseconds based on the assigned bandwidths from the bandwidth assignment function 412 and inputs from the OAM that indicates, among other things, whether or not directed upstream allocations should be provided for the PLOAMu messages for different ONUs.

According to the present disclosure and as shown in FIG. 4, a new constraint enforcement function 416 has been added to the conventional DBA engine 410, where, depending on the particular implementation, the constraint enforcement function 416 imposes a shortened-codeword constraint on the processing of the DBA engine 410 by instructing either the bandwidth assignment function 412 or the BWmap generation function 414 or both to cause the BWmap generation function 414 to generate a BWmap that will result in the OLT 110 generating a DS message to the ONU 120 instructing the ONU 120 to generate one or more US bursts, each having a single shortened codeword. In particular, that BWmap will indicate a number of information bits for the US burst that is smaller than the number of information bits in a full-size codeword for the current FEC code. This indication is represented in the form of one or more GrantSizes and the PLOAMu flag. Each unit of GrantSize represents a block of 16*phi bytes, where phi is determined by the upstream line rate (e.g., phi=1 for 12.4416 Gb/s upstream, phi=2 for 24.8832 Gb/s upsteam, phi=4 for 49.7664 Gb/s upstream, and so on).

According to the present disclosure and as shown in FIG. 4, a new trigger generation function 420 generates a trigger signal 422 that causes the constraint enforcement function 416 to impose the shortened-codeword constraint on the processing of the DBA engine 410 for the ONU 120 independent of an estimated or actual amount of data available to be transmitted by the ONU. In at least some implementations, the trigger signal 422 is independent of bandwidth considerations that are unrelated to reliability and/or robustness. The processing of the trigger generation function 420 depends on the particular implementation and may include one or more of the following:

Generate a trigger signal 422 based on an external input such as an input by the operator;

Periodically generate trigger signals 422 to result in the ONU 120 periodically transmitting US bursts having shortened codewords to enable the OLT 110 to track the BER accurately over time to monitor the ongoing suitability of the current FEC code;

Generate trigger signals 422 as needed to keep communications between the OLT 110 and the ONU 120 alive in the face of a detected high BER; and Generate trigger signals 422 to enable measurement of a high BER to determine to instruct the ONU 120 to switch to a different, lower-rate FEC code for future US bursts having full-size codewords.

In one embodiment, the shortened-codeword constraints are hard constraints that take precedence over other DBA requirements and could cause the trigger generation function 420 to violate the DBA requirements for the indicated ONUs. In another embodiment, the shortened-codeword constraints are soft constraints, and the trigger generation function 420 targets to make a compromise between the shortened-codeword constraints on one hand and the DBA requirements on the other hand. This may, for instance, be implemented by optimizing the shortened-codeword burst schedule based on a merit function, which improves the more the constraints are matched, and the more the DBA requirements are matched.

For example, to request very short codewords, the trigger generation function 420 could request a GrantSize of 0 for all allocations corresponding to an ONU while setting the PLOAMu bit in the BW map to 1 (see G.9804.3 Section 8.1.2). Then, the ONU would respond with an upstream burst (FS burst: see FIG. 8-5 of G.9804.3) having a size of 52 Bytes (FS header)+4 Bytes (FS trailer). Thus, the information content of the codeword would be only 56 Bytes.

Figure 5:
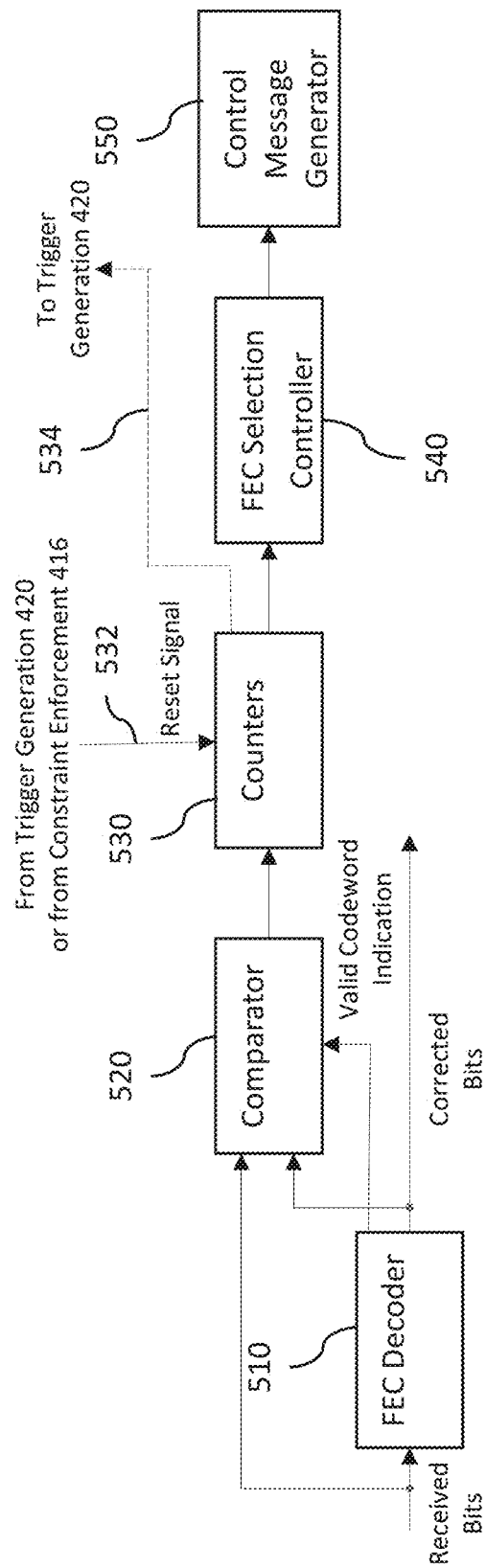
FIG. 5 is a functional block diagram of processing performed in implementations of the OLT of FIG. 1 that use US bursts having shortened codewords to determine whether to switch to a different FEC code for future US bursts.

FIG. 5 is a functional block diagram of processing performed in implementations of the OLT 110 of FIG. 1 that use US bursts having shortened codewords to determine whether to switch to a different FEC code for future US bursts. As shown in FIG. 5, in general and depending on the particular implementation, the FEC decoder 510 decodes each codeword in an US burst received from an ONU 120, the valid codeword indication indicates whether the received codeword successfully decoded to a valid codeword or not, comparator 520 compares the received codeword to the decoded codeword if the valid codeword indication indicates successful decoding to determine how many bit errors were corrected, the one or more counters 530 for each ONU increment their corresponding count values as appropriate, the FEC selection controller 540 determines whether to switch from the current FEC code to a different FEC code that is more appropriate for the current BER level, and control message generator 550 generates the DS messages to be transmitted to the ONU 120.

As shown in FIG. 5, depending on the particular implementation, the counters 530 receive a reset signal 532 from either the trigger generation function 420 or the constraint enforcement function 416 of FIG. 4. If and when the processing of FIG. 4 determines that the ONU 120 should start to generate a sequence of one or more US bursts having only shortened codewords, then the reset signal 532 is asserted (e.g., set high) to instruct the counters 530 to reset their counter values to zero so that, from that time on, the values generated by the counters 530 will reflect the bit errors associated with only shortened codewords. Note that there might be some delay in resetting the counters. For example, the counters might be reset only when the bursts corresponding to the trigger signal are going to be received. In that sense, it may be said that the counter values are reset based on the trigger signal.

As also shown in FIG. 5, the count values 534 from one or more of the counters 530 are provided to the trigger generation function 420 of FIG. 4 for those implementations that generate trigger signals 422 based on the numbers of bit errors.

Table 14-1 of the G.9804.2 standard defines the following counters 530 for each ONU:
N1=Number of corrected FEC bits;
N2=Number of corrected FEC codewords;
N3=Number of uncorrected FEC codewords; and
N4=Total number of FEC codewords.
In some implementations of the disclosure, the trigger generation function 420 of FIG. 4 relies on the count values generated by one or more of these counters 530 to determine whether to assert the trigger signal 422. For example, BER may be estimated as N1/((N4-N3)*N5), or as N1/(N2*N5) where N5 is the total number of bits in a codeword. If and when the estimated BER exceeds a specified threshold for a specified number of shortened-codeword bursts or a running average estimated BER exceeds a specified threshold, then the FEC selection controller 540 determines to switch to a different FEC code. These particular counters are based on the assumption that each codeword has the same total number of bits.

In other implementations, the assumption that each codeword has the same total number of bits is relaxed to enable different shortened codewords to have different total numbers of bits, albeit always less than or equal to the total number of bits in a full-size codeword. In those implementations, the following counters may be included in the counters 530 of FIG. 5:
$N_{total}$=Number of information+parity bits in successfully corrected codewords; and
$N_{corr}$=Number of corrected information+parity bits in successfully corrected codewords.
In that case, the BER can be estimated as $N_{corr}/N_{total}$. Note that it is preferred that the number of corrected FEC bits is counted over both the information and parity parts of the codewords. This is especially desired for shortened codewords, since there may be more parity bits than information bits in shortened codewords. An alternative is to count the corrected FEC bits over only the information bits.

As described previously, one option is to continuously schedule shortened-codeword bursts in order to monitor the BER during normal operations. In addition or alternatively, shortened-codeword bursts can be requested when the BER measured using full-size codewords starts to get too high (e.g., exceed a predetermined threshold) or when full-size codewords begin to become unable to be successfully decoded. In general, the lower the BER, the more shortened codewords may be needed to estimate BER.

This BER measurement protocol can be initiated per ONU and under multiple circumstances, for example, at the request of the operator, repeatedly at given intervals, when an ONU is activating, or automatically based on certain triggers (e.g., when codewords are being lost or higher-layer (XGEM) packets are being dropped or when the OLT is unable to detect bursts from the ONU).

As mentioned, shortened codewords can also be used to keep a link alive and allow a switch of the FEC code when the BER suddenly deteriorates. For instance, based on a trigger for an ONU (e.g., there are suddenly missing bursts/uncorrectable codewords), the trigger generation function 420 can send a trigger signal 422 to indicate that only shortened codewords should be send to that ONU. This will effectively reduce the code rate, so that the US link becomes again operational, and the FEC code can be switched. Once the FEC code is switched, the trigger signal 422 can be de-asserted, and regular burst transmissions can be resumed.

Although the disclosure has been described in the context of US messages transmitted in TDM or TWDM bursts from an ONU to the OLT of a PON system, those skilled in the art will understand that the techniques of the disclosure can be applied in other contexts, such as US and/or DS messaging in other optical communication networks and in wired or wireless communication networks.

In certain embodiments, the present disclosure is an upstream (US) optical line terminal (OLT) for a passive optical network (PON) having at least one downstream (DS) optical network unit (ONU), the OLT comprising a processor configured to control (i) transmit operations of a transmitter of the OLT and (ii) receive operations of a receiver of the OLT, wherein the OLT is configured to (a) generate a trigger signal indicating a need to receive at least one US burst having a shortened codeword for a first forward error-correction (FEC) code; (b) based on the trigger signal, transmit, to the ONU, a DS message instructing the ONU to transmit, to the OLT, an US burst having a shortened codeword; (c) receive, from the ONU, the US burst having the shortened codeword; and (d) decode the US burst having the shortened codeword using the first FEC code.

In at least some of the above embodiments, the OLT is configured to generate the trigger signal based on one or more of (i) decoding one or more previous bursts; (ii) an external input; and (iii) a predefined periodic timing pattern.

In at least some of the above embodiments, the OLT is configured to generate the trigger signal independent of an estimated or actual amount of data available to be transmitted by the ONU.

In at least some of the above embodiments, the trigger signal is configured to override normal bandwidth assignment processing by the OLT's Dynamic Bandwidth Assignment (DBA) engine.

In at least some of the above embodiments, the OLT is configured to determine, based on zero, one, or more detected errors in the shortened codeword, to instruct the ONU to replace the first FEC code with a different FEC code for future US bursts.

In at least some of the above embodiments, the OLT is configured to determine, based on one or more detected errors in the shortened codeword, to continue to instruct the ONU to transmit, to the OLT, bursts having shortened codewords using the first FEC code in order to maintain communication from the ONU to the OLT.

In at least some of the above embodiments, the shortened codeword comprises a maintenance message.

In at least some of the above embodiments, the maintenance message is a Physical-Layer Operation Administration and Maintenance (PLOAM) message or an ONU Management and Control Interface (OMCI) message.

In at least some of the above embodiments, the DS message comprises a grant size of zero for the US burst.

In at least some of the above embodiments, the US burst comprises two or more shortened codewords.

In at least some of the above embodiments, the US burst comprises a single codeword, wherein the single codeword is a shortened codeword.

In at least some of the above embodiments, each shortened codeword has a codeword size that is smaller than a specified upper limit that is smaller than the codeword size of a full-size codeword.

In at least some of the above embodiments, the OLT is configured to generate the trigger signal after one or more of (i) determining that bit error rate (BER) in the one or more previous US bursts has reached a threshold level, (ii) detecting one or more packet drops, (iii) detecting one or more lost codewords, and (iv) detecting one or more missing US bursts.

In at least some of the above embodiments, contents of the shortened codeword are known a priori by the OLT such that the OLT can detect errors in the shortened codeword without having to decode the shortened codeword.

In at least some of the above embodiments, the OLT is configured to maintain one or more of (i) a first counter value for a number of information bits plus parity bits in successfully corrected codewords and (ii) a second counter value for a number of corrected information bits plus parity bits in successfully corrected codewords.

In at least some of the above embodiments, the OLT is configured to (a) maintain the first and second counter values and (b) estimate BER based on the second counter value divided by the first counter value.

In at least some of the above embodiments, the OLT is configured to reset the first and second counter values based on the trigger signal.

In at least some of the above embodiments, the OLT conforms to a PON G.9804.2 standard.

In at least some of the above embodiments, the OLT is configured to generate the trigger signal based on one or more of (i) decoding one or more previous bursts, (ii) an external input, and (iii) a predefined periodic timing pattern. In addition, the OLT is configured to generate the trigger signal independent of an estimated or actual amount of data available to be transmitted by the ONU, the trigger signal is configured to override normal bandwidth assignment processing by the OLT's DBA engine, the US burst comprises a single codeword, wherein the single codeword is a shortened codeword, and the OLT conforms to a PON G.9804.2 standard.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. An upstream (US) optical line terminal (OLT) for a passive optical network (PON) having at least one downstream (DS) optical network unit (ONU), the OLT comprising a processor configured to control (i) transmit operations of a transmitter of the OLT and (ii) receive operations of a receiver of the OLT, wherein the OLT is configured to:
   generate a trigger signal indicating a need to receive at least one US burst having a shortened codeword for a first forward error-correction (FEC) code;
   based on the trigger signal, transmit, to the ONU, a DS message instructing the ONU to transmit, to the OLT, an US burst having a shortened codeword;
   receive, from the ONU, the US burst having the shortened codeword; and
   decode the US burst having the shortened codeword using the first FEC code, wherein at least one of (a)-(h):
      (a) the trigger signal is configured to override normal bandwidth assignment processing by the OLT's Dynamic Bandwidth Assignment (DBA) engine;
      (b) the OLT is configured to determine, based on zero, one, or more detected errors in the shortened codeword, to instruct the ONU to replace the first FEC code with a different FEC code for future US bursts;
      (c) the shortened codeword comprises a maintenance message;
      (d) the US burst comprises two or more shortened codewords;
      (e) the US burst comprises a single codeword, wherein the single codeword is a shortened codeword;
      (f) each shortened codeword has a codeword size that is smaller than a specified upper limit that is smaller than the codeword size of a full-size codeword;
      (g) contents of the shortened codeword are known a priori by the OLT such that the OLT can detect errors in the shortened codeword without having to decode the shortened codeword; and
      (h) the OLT is configured to maintain one or more of:
         (1) a first counter value for a number of information bits plus parity bits in successfully corrected codewords; and
         (2) a second counter value for a number of corrected information bits plus parity bits in successfully corrected codewords.

2. The OLT of claim 1, wherein the OLT is configured to generate the trigger signal based on one or more of:
   decoding one or more previous bursts;
   an external input; and
   a predefined periodic timing pattern.

3. The OLT of claim 1, wherein the OLT is configured to generate the trigger signal independent of an estimated or actual amount of data available to be transmitted by the ONU.

4. The OLT of claim 1, wherein the trigger signal is configured to override normal bandwidth assignment processing by the OLT's Dynamic Bandwidth Assignment (DBA) engine.

5. The OLT of claim 1, wherein the OLT is configured to determine, based on zero, one, or more detected errors in the shortened codeword, to instruct the ONU to replace the first FEC code with a different FEC code for future US bursts.

6. The OLT of claim 1, wherein the OLT is configured to determine, based on one or more detected errors in the shortened codeword, to continue to instruct the ONU to transmit, to the OLT, bursts having shortened codewords using the first FEC code in order to maintain communication from the ONU to the OLT.

7. The OLT of claim 1, wherein the shortened codeword comprises a maintenance message.

8. The OLT of claim 7, wherein the maintenance message is a Physical-Layer Operation Administration and Maintenance (PLOAM) message or an ONU Management and Control Interface (OMCI) message.

9. The OLT of claim 7, wherein the DS message comprises a grant size of zero for the US burst.

10. The OLT of claim 1, wherein the US burst comprises two or more shortened codewords.

11. The OLT of claim 1, wherein the US burst comprises a single codeword, wherein the single codeword is a shortened codeword.

12. The OLT of claim 1, wherein each shortened codeword has a codeword size that is smaller than a specified upper limit that is smaller than the codeword size of a full-size codeword.

13. The OLT of claim 1, wherein the OLT is configured to generate the trigger signal after one or more of (i) determining that bit error rate (BER) in the one or more previous US bursts has reached a threshold level, (ii) detecting one or more packet drops, (iii) detecting one or more lost codewords, and (iv) detecting one or more missing US bursts.

14. The OLT of claim 1, wherein contents of the shortened codeword are known a priori by the OLT such that the OLT can detect errors in the shortened codeword without having to decode the shortened codeword.

15. The OLT of claim 1, wherein the OLT is configured to maintain one or more of:
   (i) a first counter value for a number of information bits plus parity bits in successfully corrected codewords; and
   (ii) a second counter value for a number of corrected information bits plus parity bits in successfully corrected codewords.

16. The OLT of claim 15, wherein the OLT is configured to (a) maintain the first and second counter values and (b) estimate BER based on the second counter value divided by the first counter value.

17. The OLT of claim 15, wherein the OLT is configured to reset the first and second counter values based on the trigger signal.

18. The OLT of claim 1, wherein the OLT conforms to a PON G.9804.2 standard.

19. The OLT of claim 1, wherein:
   the OLT is configured to generate the trigger signal based on one or more of:
      decoding one or more previous bursts;
      an external input; and
      a predefined periodic timing pattern;
   the OLT is configured to generate the trigger signal independent of an estimated or actual amount of data available to be transmitted by the ONU;
   the trigger signal is configured to override normal bandwidth assignment processing by the OLT's DBA engine;
   the US burst comprises a single codeword, wherein the single codeword is a shortened codeword; and
   the OLT conforms to a PON G.9804.2 standard.

20. A method for a US OLT for a PON having at least one DS ONU, the method comprising the OLT:
   generating a trigger signal indicating a need to receive at least one US burst having a shortened codeword for a first FEC code;
   based on the trigger signal, transmitting, to the ONU, a DS message instructing the ONU to transmit, to the OLT, an US burst having a shortened codeword;

receiving, from the ONU, the US burst having the shortened codeword; and decoding the US burst having the shortened codeword using the first FEC code, wherein at least one of (a)-(h):
- (a) the trigger signal is configured to override normal bandwidth assignment processing by the OLT's Dynamic Bandwidth Assignment (DBA) engine;
- (b) the OLT is configured to determine, based on zero, one, or more detected errors in the shortened codeword, to instruct the ONU to replace the first FEC code with a different FEC code for future US bursts;
- (c) the shortened codeword comprises a maintenance message;
- (d) the US burst comprises two or more shortened codewords;
- (e) the US burst comprises a single codeword, wherein the single codeword is a shortened codeword;
- (f) each shortened codeword has a codeword size that is smaller than a specified upper limit that is smaller than the codeword size of a full-size codeword;
- (g) contents of the shortened codeword are known a priori by the OLT such that the OLT can detect errors in the shortened codeword without having to decode the shortened codeword; and
- (h) the OLT is configured to maintain one or more of:
  - (1) a first counter value for a number of information bits plus parity bits in successfully corrected codewords; and
  - (2) a second counter value for a number of corrected information bits plus parity bits in successfully corrected codewords.

21. The method of claim 20, wherein the trigger signal overrides normal bandwidth assignment processing by the OLT's Dynamic Bandwidth Assignment (DBA) engine.

22. The method of claim 20, wherein the OLT determines, based on zero, one, or more detected errors in the shortened codeword, to instruct the ONU to replace the first FEC code with a different FEC code for future US bursts.

23. The method of claim 20, wherein the shortened codeword comprises a maintenance message.

24. The method of claim 23, wherein the maintenance message is a Physical-Layer Operation Administration and Maintenance (PLOAM) message or an ONU Management and Control Interface (OMCI) message.

25. The method of claim 23, wherein the DS message comprises a grant size of zero for the US burst.

26. The method of claim 20, wherein the US burst comprises two or more shortened codewords.

27. The method of claim 20, wherein the US burst comprises a single codeword, wherein the single codeword is a shortened codeword.

28. The method of claim 20, wherein each shortened codeword has a codeword size that is smaller than a specified upper limit that is smaller than the codeword size of a full-size codeword.

29. The method of claim 20, wherein contents of the shortened codeword are known a priori by the OLT such that the OLT can detect errors in the shortened codeword without having to decode the shortened codeword.

30. The method of claim 20, wherein the OLT maintains one or more of:
- (i) a first counter value for a number of information bits plus parity bits in successfully corrected codewords; and
- (ii) a second counter value for a number of corrected information bits plus parity bits in successfully corrected codewords.

31. The method of claim 30, wherein the OLT (a) maintains the first and second counter values and (b) estimates BER based on the second counter value divided by the first counter value.

32. The method of claim 30, wherein the OLT resets the first and second counter values based on the trigger signal.

* * * * *